May 14, 1940.     O. STEINER     2,200,458
FOCUSING ILLUMINATING ATTACHMENT FOR PHOTOGRAPHIC FLASH GUNS, ETC
Filed June 21, 1938
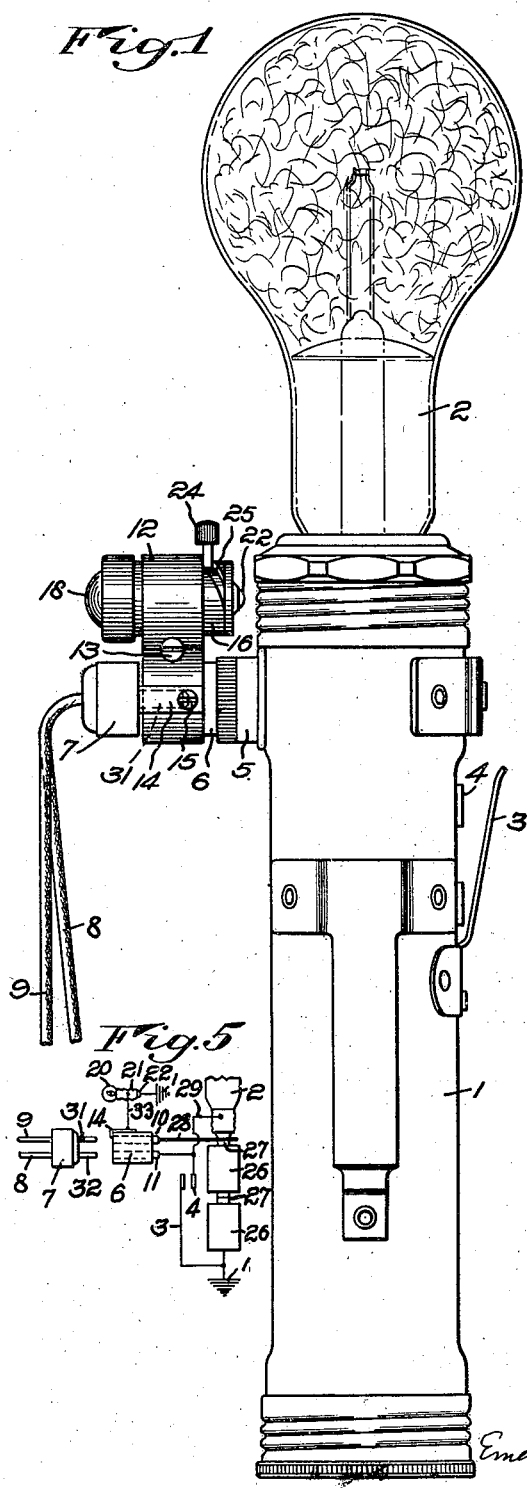
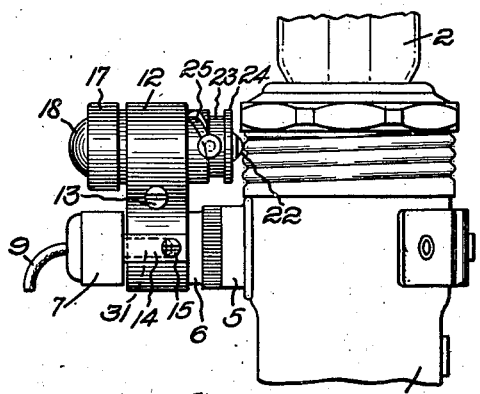
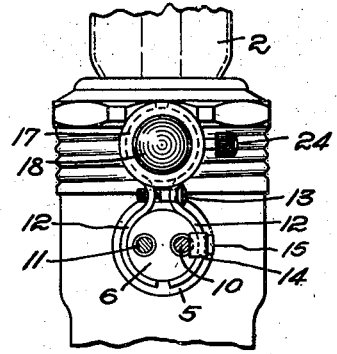
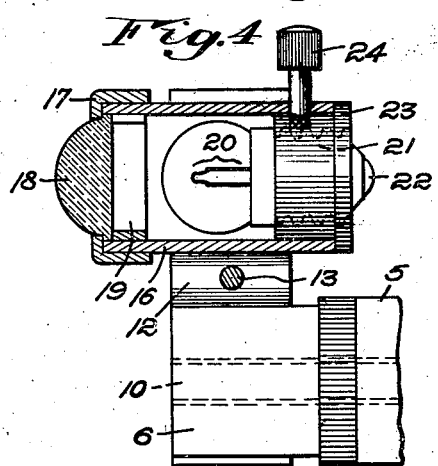
INVENTOR.
Oscar Steiner,
BY
ATTORNEYS.

Patented May 14, 1940

2,200,458

UNITED STATES PATENT OFFICE 2,200,458

FOCUSING ILLUMINATING ATTACHMENT FOR PHOTOGRAPHIC FLASH GUNS, ETC.

Oscar Steiner, Irondequoit, N. Y., assignor to The Folmer Graflex Corporation, Rochester, N. Y., a corporation of Delaware Application June 21, 1938, Serial No. 214,898

4 Claims. (Cl. 67—31)

This invention relates to photographic equipment particularly concerned with cameras when used for making photographic flash exposures.

In order that the principle of the invention may be readily understood, I have disclosed a single embodiment thereof in the accompanying drawing, wherein Fig. 1 is a side elevation of a common type of photographic flash synchronizer battery case with my invention applied thereto, showing the switch in the open circuit condition;

Fig. 2 is a fragmentary view similar to Fig. 1 but showing the switch in contact or closed position;

Fig. 3 is a fragmentary front elevation of the structure shown in Fig. 1 and indicating the placement of parts on the battery case;

Fig. 4 is a partial vertical section of Fig. 3 showing the construction of the illuminating device; and Fig. 5 is a circuit diagram showing the relationship between the battery case connections and illuminator connections.

It is a well known fact that when the usual conditions maintain for the use of a "photo flash," the light conditions are below the level for satisfactory focusing of the camera either by the ground glass method or by the range finder method. It has been common practice for years to have some one at the principal point of the picture hold a flash light or a lighted match for the purpose of focusing. This is rather inconvenient and at times is very impractical. By my invention I have provided means whereby the subject matter or object to be photographed can be illuminated sufficiently for focusing regardless of light conditions. Since cameras equipped for making "photo flashlights" are already equipped with a battery case and batteries, I have utilized this source of electrical power to illuminate a lamp that is detachably applied as a separately manufactured unit to the "photo flash" synchronizer battery case in a very simple manner and without the use of any external wiring, inasmuch as the lamp becomes operable by a simple switch control means.

It will be apparent that such illuminating means may also be used for other purposes than for merely focusing. It, for instance, can be used as a flashlight for finding one's way in the dark, or it may be used in connection with cameras employed by the police for searching prior to making a photograph, and it will serve a further purpose as an indicator of the condition of the batteries used with a "photo flash" synchronizer. A very accurate check may be made on the batteries by noting the brilliancy of the lamp when illuminated. This will forestall the possibility of arriving at the place to make a picture with the batteries in a run-down condition. There will no doubt be numerous other uses to which this device can be applied, and which will readily suggest themselves to the user.

The disclosed embodiment of the illuminating device proper includes means for providing a light beam substantially parallel to the axis of the lens used to make the photograph. Such beam can be so adjusted that the center of the spot of light will represent approximately the axis of the photographic lens. When the device is in this adjustment the camera can be preset to a predetermined distance and the beam itself used as a finder in making a photograph in total darkness. The operation of this invention will be more clearly described presently.

Referring more particularly to the drawing, from which the operation of the invention will be clearly understood, the battery case of an ordinary flash light is represented at 1 in Figs. 1, 2 and 3, a photo flash bulb at 2, a contact switch member on the battery at 3, and a contact insulated from the battery case 1 at 4. A projection on the battery case is provided at 5 which supports an insulated bushing 6 into which fits a contact plug 7 having wires 8 and 9 attached thereto. The said wires normally run to an electromagnet for tripping the shutter.

The construction thus far described may be a standard one, the photo-flash or flash bulb thereof being mounted upon the battery case 1, which case is provided with a usual lateral projection 5, so that wires may be plugged in that lead to the shutter of the camera. Such a structure is manufactured and sold without any light focusing means. It is an important purpose of my invention to provide for the detachable connection to such a flash light of means to provide a focusing light means, which focusing light means may be separately manufactured and applied to a flash light or for a flash equipment otherwise devoid thereof. Thus, the subject matter of my invention is adapted to be separately manufactured and sold and applied to existing flash light structures otherwise devoid of focusing means.

Referring particularly to Fig. 3, the plug 7 has been removed to show the exposed end of the insulating bushing 6 and to show the two contact or terminal tubes or holes 10 and 11 into which prongs on the contact plug 7 enter. To the insulated bushing 6 is clamped by members 12—12 a cylindrical part or housing 16, Fig. 4. The members 12—12 are held in place by a screw 13. To one of the clamp members 12 is attached a flexible brass spring contact 14 by a screw 15. The purpose of this is to make contact with the plug 7 that connects into terminal tube 10. This will be more fully disclosed presently.

In Fig. 4 is more particularly shown the cylinder shaped part or housing 16 to which is attached a bushing 19 against which rests a lens 18 held in place by a ferrule 17. A conventional flashlight bulb is indicated at 20 as provided with a threaded portion 21 and contact member 22 threaded into an annular member 23. Said member 23 has attached thereto a knob 24 which rides in a spiral groove 25 in the part 16, as clearly shown in Figs. 1 and 2, causing said member 23 carrying bulb 20 to move forward when turned counterclockwise and rearward when turned clockwise.

In Fig. 1 the said knob 24 has been turned counterclockwise as far as it will go, thus separating the contact member 22 from the battery case 1. In Fig. 2, the said knob 24 has been moved clockwise until the contact member 22 is in contact with the battery case 1, at which time the bulb 20 will become illuminated, completing the electrical circuit shown in Fig. 5.

In operation, the illuminating unit herein above described is slipped over the bushing 6 and is clamped in place by the screw 13, which places the contact spring 14 in the position shown in Fig. 2. The plug 7 is now inserted by pushing the prongs 31 and 32 into the tubes or holes 10 and 11 in the insulated bushing 6. It will be noted that the contact spring 14 slightly overlays the tube 10, causing contact to be made with the prong 31 when said plug 7 is in place.

Assuming that the battery case 1 is equipped with batteries to cause the illuminator to function, it is merely necessary to turn the knob 24 in a clockwise direction until the circuit is completed through the contact 22 and the said battery case 1.

In Fig. 5 is clearly shown a diagram of a preferred circuit arrangement, but it will be evident that numerous other circuits could be adapted for this purpose. In Fig. 5, however, is shown a circuit of a well known flash gun to which this invention is readily adaptable, but to use with which my invention is not limited.

Enclosed in the battery case 1 are two or more flashlight cells designated in the circuit diagram of Fig. 5 as 26—26. Each of these cells is provided with a central contact 27—27, and the ends of the cells are bare, thus supplying the other contact point. The said cells are placed in series as clearly shown in the diagram Fig. 5, and one end of the cells is grounded to the battery case 1. The upper end of the cells contacts with a metal strip 28 which also contacts with a lower portion on the central contact of the flash bulb. The outer or screw part of the flash bulb is connected to a wire 29 and to the contact button 4. The contact member 3 is grounded to the battery case 1. The bushing 6 has one terminal connected to the contact plate 28. The other terminal is connected to said wire 29. The contact member 14 is connected to the screw portion 21 of the flashlight bulb 20 by a wire 33. The contact member 22, when in the contact making position, is grounded through the battery case 1. The contact plug 7 has contact prongs 31, 32 which fit into the contact tubes or holes 10 and 11 in the bushing 6. The wire 9 is connected to the contact prong 31 and the wire 8 is connected to the contact prong 32.

It will be noted that in this disclosure of my invention, this illuminating device is very small in size in comparison to the flashlight gun and has been kept very low in weight. These are very important factors since the photographer has to transport all of his equipment from place to place and the weight and bulb should be kept to an absolute minimum. This I believe I have accomplished by this invention.

So far as I am aware, a focusing means such as a lamp has never before been provided for ready attachment to a flashlight or photo-flash equipment not otherwise provided therewith, although it has been proposed to build a pilot light in as an integral part of a flashlight housing, as shown in the patent to Tracy, No. 1,973,937, September 18, 1934. I have provided such a readily attachable device and, as will be clearly understood from the foregoing description, the said focusing means is itself readily attachable to and detachable from the case or body of the flashlight itself and may be separately manufactured, to be applied to standard flashlights without change in the structure of such flashlights, or the flashlights may be readily modified to receive the said focusing means.

It will be observed that in the use of my invention, the circuit through which the focusing bulb 20 is illumined is so far independent of or distinct from the circuit through which the photo-flash bulb 2 is set off through the bringing together of the contacts 3, 4, that it is immaterial whether or not the flash bulb 2 is in position when it is desired to use the focusing bulb 20.

Having thus described one illustrative embodiment of the invention, it is to be understood that although specific terms are employed, they are used in a generic and descriptive sense and not for purposes of limitation, the scope of the invention being set forth in the following claims.

I claim:

1. A flashlight or "photo-flash" equipment provided with a casing having a battery, one side or terminal of the battery being grounded to the casing, the said casing having a structural lateral projection, an insulating bushing with conducting members carried thereby, the second terminal of the battery being connected to one of the conducting members in said bushing, a contact plug insertable in said bushing for completing the circuit to an electrical shutter-operating means, an auxiliary electric lamp bulb for focusing purposes, and a housing or container carried by said bushing and electrically connected to the said one conducting member, a movable electric lamp bulb carrying-element carried by and in electrical contact with said housing or container, said element being movable to bring one terminal of said lamp bulb into contact with the battery casing, the other contact of said lamp bulb being in electrical contact with said bulb carrying-element, said housing or container constituting with said element and said auxiliary lamp bulb, a separate unit that is supported upon said bushing, the electrical connections to said auxiliary lamp bulb being independent of the photo-flash lamp, thereby preventing ignition of the latter in illuminating said auxiliary lamp bulb.

2. A flashlight or photo-flash equipment provided with a casing having a battery, one side or terminal of said battery being grounded to the casing, the said casing having a structural lateral projection, an insulating bushing with conducting members carried by said lateral projection, the second terminal of the battery being connected to one of the conducting members in said bushing, a contact plug insertable in said bushing for completing the circuit to an electrical shutter-operating means, an auxiliary electric lamp bulb for focusing purposes, a housing or container for said auxiliary lamp bulb carried by said bushing and electrically connected to said one conducting member, movable switch means for said electric lamp bulb, said switch means being carried by said housing or container and in electrical contact therewith, and having means, when operated, to cause one terminal of said lamp bulb to contact with the battery casing, the other contact of said lamp bulb being in electrical contact with said movable switch means, said housing or container having a lens in operative relation to said auxiliary lamp bulb, said housing or container constituting, with said movable switch means and said auxiliary lamp bulb, a separate unit that is supported upon said bushing, the electrical connections to the auxiliary lamp bulb being independent of the photo-flash lamp, thereby preventing ignition of the latter in illuminating said auxiliary lamp bulb.

3. As a new article of separate manufacture and sale, an auxiliary electric lamp bulb attachment for camera focusing purposes expressly adapted for application to separately manufactured flashlight equipment each provided with a battery casing with battery, a photo-flash lamp, a complete electric circuit from said battery to said lamp and return, such battery casing being electrically conductive and connected to one battery terminal, such equipment having contact means for completing a circuit to an electrical shutter-operating means, but which equipments are devoid of lamps for focusing purposes, said attachment having an auxiliary electric lamp bulb for focusing purposes, and also having a housing or container provided with means to secure the same fixedly but detachably upon and insulated from such battery casing of such equipment, said housing or container, when so secured in place, being electrically connected to an ungrounded conducting member of the said flashlight equipment, a movable electric lamp bulb carrying-element carried by and in electrical contact with said housing or container, said element being movable to bring one terminal of the said lamp bulb into contact with the said battery casing, the other contact of the said lamp bulb being in electrical contact with said bulb carrying-element, said housing or container constituting, with said element and said auxiliary lamp bulb, a separate unit that is, in use, supported fixedly but detachably upon such flashlight equipment and insulated therefrom, the electrical connections to said auxiliary lamp bulb, when said attachment is secured upon such battery casing, being independent of the photo-flash lamp, thereby preventing ignition of the latter in illuminating said auxiliary lamp bulb and also independent of such shutter-operating means.

4. As a new article of separate manufacture and sale, an auxiliary electric lamp bulb attachment for camera focusing purposes expressly adapted for application to separately manufactured flashlight equipments each provided with a battery casing with battery, a photo-flash lamp, a complete electric circuit from said battery to said lamp and return, such battery casing being electrically conductive and connected to one battery terminal, such equipment having contact means for completing a circuit to an electrical shutter-operating means, but which equipments are devoid of lamps for focusing purposes, said attachment having an auxiliary electric lamp bulb for focusing purposes, and also having a housing or container provided with means to secure the same fixedly but detachably upon and insulated from such battery casing of such equipment, said housing or container, when so secured in place, being electrically connected to an ungrounded conducting member of the said flashlight equipment, said housing or container having a lens in operative relation to said auxiliary lamp bulb, an electric lamp bulb carrying-element carried by and in electrical contact with, said housing or container, said electric lamp bulb carrying-element being movable to and fro in said housing or container for bringing one terminal of said lamp bulb into contact with the battery casing, the other contact of the said lamp bulb being in electrical contact with said bulb carrying-element, said housing or container constituting, with said element and said auxiliary lamp bulb a separate unit that is, in use, supported fixedly but detachably upon such flashlight equipment and insulated therefrom, the electrical connections to said auxiliary lamp bulb, when the said attachment is secured upon such battery casing, being independent of the photo-flash lamp, thereby preventing ignition of the latter in illuminating said auxiliary lamp bulb and also independent of such shutter-operating means.

OSCAR STEINER.